United States Patent Office 3,455,960
Patented July 15, 1969

1

3,455,960
4-PYRONES
Alfred A. Schleppnik, St. Louis, and Marvin L. Oftedahl, Crestwood, Mo., assignors to Monsanto Company, St. Louis, Mo., a corporation of Delaware
No Drawing. Filed Sept. 14, 1966, Ser. No. 579,226
Int. Cl. C07d 7/16
U.S. Cl. 260—345.9                    6 Claims

ABSTRACT OF THE DISCLOSURE

Preparation of 4-pyrones by reacting (a) hydroxy or unsaturated ketone with a formate ester, (b) acetylating the condensation product, (c) replacing the acetoxy group with a mono- or dialkoxy group, (d) epoxidation of the remaining unsaturated linkage, (e) cyclization of the intermediate, (f) oxidation to yield the dihydro-4-pyrone derivative, (g) acid hydrolyze to yield the 4-pyrone derivative.

The intermediates are new and valuable compounds.

4-pyrones are utilized as flavor enhancers in food products.

---

This invention relates to a new process for the preparation of 4-pyrones and in particular to the preparation of 1-hydroxypenta-1,4-diene-3-one, 1-acyloxypenta-1,4-diene-3-one and 2-methyl-3-hydroxy-4-pyrone.

Maltol, 2-methyl-3-hydroxy-4-pyrone, is well known for its usefulness as a flavor enhancer in food products and various beverages, including breads, cakes, pies, candies, coffee and the like. It is also used as an ingredient in perfumes and essences.

Maltol has been previously obtained by extraction of a natural product or synthetically, utilizing a fermentation product, kojic acid, 2-hydroxymethyl-5-hydroxy-4-pyrone, as the starting compound. Products obtained from fermentation processes and extraction of natural products require expensive purification processes which thus complicate the process and materially increase production costs.

It is therefore an object of this invention to provide a novel synthetic process for the preparation of 4-pyrones which eliminates the above disadvantages.

It is a further object of this invention to provide a process for the preparation of hydroxyalka-1,4-diene-3-ones.

It is a still further object of this invention to provide a process for the preparation of 1-acyloxyalka-1,4-diene-3-ones.

It is a more specific object of this invention to provide a process for the preparation of 2-methyl-3-hydroxy-4-pyrone.

Further objects, aspects and advantages of the invention will be apparent from the description which follows.

Briefly, this invention provides a process for the preparation of 2-alkyl-3-hydroxy-4-pyrones by a synthetic chemical process utilizing commercially available compounds. The intermediates formed during this synthetic process are new and valuable compounds used in the synthesis of maltol and other heterocyclic compounds.

Synthesis of 2-alkyl-3-hydroxy-4-pyrones, according to this invention, proceeds by the following sequence of reactions:

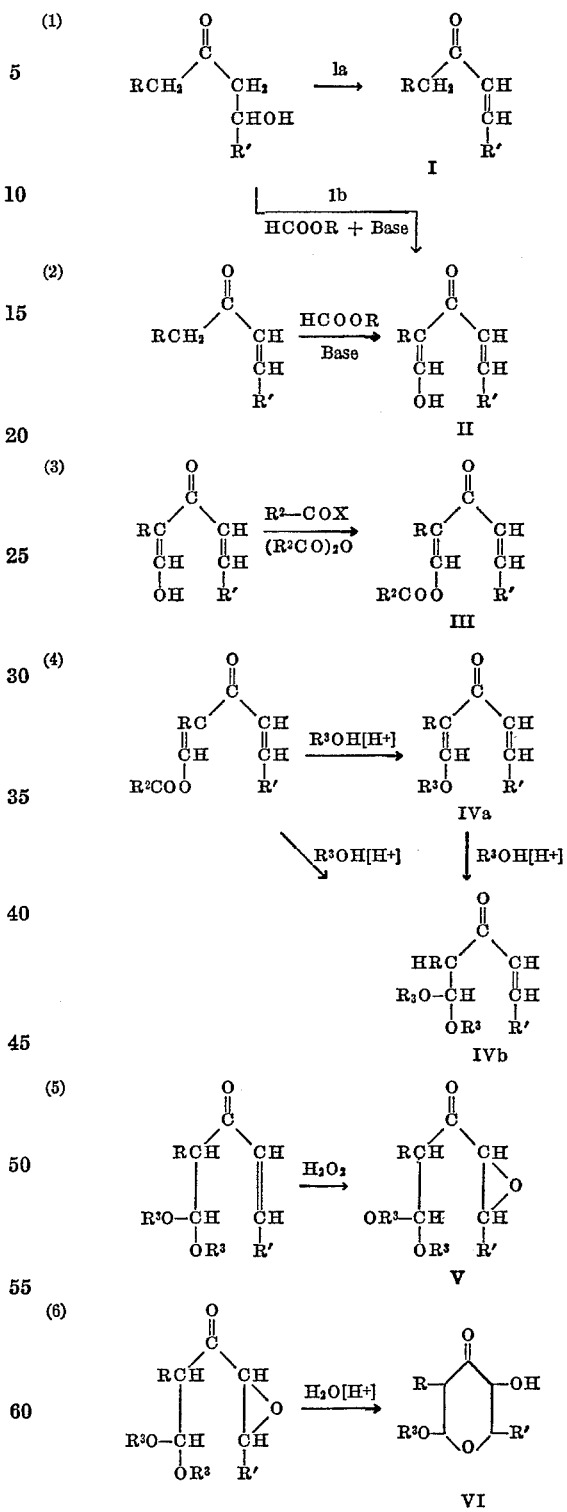

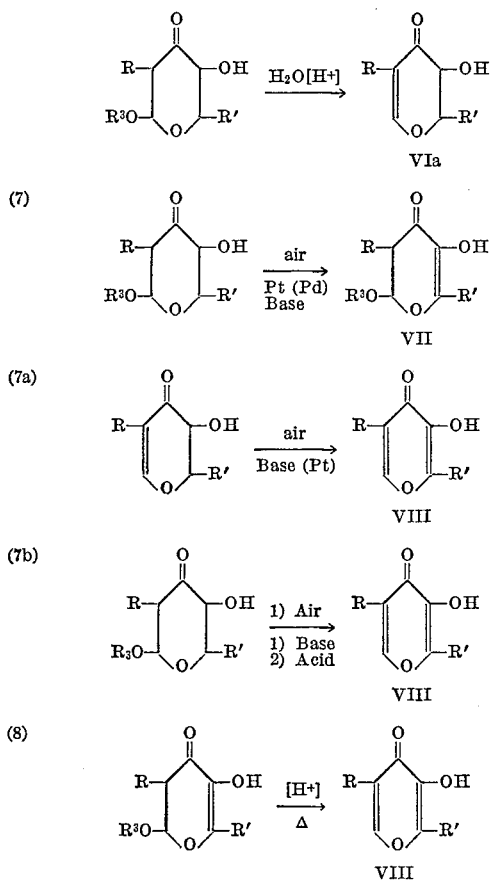

wherein R is a hydrogen, alkyl or aryl group, R' is an alkyl group having a maximum of 4 carbon atoms, $R^2$ is an alkyl or aromatic group and $R^3$ is an alkyl group having a maximum of 6 carbon atoms.

The synthesis may be started from either reaction (1) or reaction (2), that is from either the β-hydroxyketone or the alkenone compound. When the β-hydroxyketone is utilized as the starting compound the reaction may not go through the intermediate alkenone (route 1a) as illustrated, but instead can proceed directly to the formylated compound (route 1b) which would indicate that formylation occurred first followed by dehydration. In either event, the intermediate (I) is not isolated and the reaction proceeds to the intermediate (II), 1-hydroxyalka-1,4-diene-3-one.

Preparation of both types of starting compounds, is by condensation reaction in which a ketone and an aldehyde are condensed, usually in a basic medium, to give either the β-hydroxyketone or the alkenone. β-hydroxyketones are readily dehydrated to the alkenone compound according to conventional methods. For example, the condensation of acetone with acetaldehyde leads to the formation of 4-hydroxypentan-2-one or pent-3-ene-2-one, which is the starting compound for the formation of maltol. Other ketones and aldehydes which can be condensed to yield useful products, according to the present invention, are: methyl ethyl ketone, diethyl ketone, ethyl propyl ketone, dipropyl ketone, propionaldehyde, n-butylaldehyde, isobutylaldehyde and the like. Many of these condensation reaction products are commercially available.

The reaction of 4-hydroxyalkane-2-one or 3-alkene-2-one with a formate ester in a basic medium gives 1-hydroxyalka-1,4-diene-3-one (II). This compound exists in its metal enolate form in the basic medium and does not have to be isolated prior to its reaction with some acylating agents, such as benzoyl chloride, to form the 1-acyloxyalka-1,4-diene-3-one (III). Normally, however, the sodium enolate compound is isolated.

Formylation is dependent on both temperature and the starting compound. The formylation reaction can be run at temperatures up to about 50° C., however, competitive reactions occur at the higher temperatures decreasing the yield of 1-hydroxyalka-1,4-diene-3-one.

Alkenone compounds are very reactive due to the conjugated system of the carboxyl and ethylenic linkages. The compounds tend to polymerize in either acidic or basic medium, increasing in rate as the temperature increases. Since formylation reactions are run in a basic medium, it has been found desirable to lower the reaction temperature below about 0° C. and preferably below about —5° C. when the alkenone is used as the starting compound. Above about 0° C., the competitive polymerization reaction increases lowering the yield of the desired formylated compound.

When the β-hydroxyketone is utilized as the starting compound, competitive polymerization or condensation reactions are not as prevalent as in the alkenones eliminating the need for low reaction temperatures. The reaction however, is still temperature dependent in that the rate of formylation decreases as the temperature decreases. It is deisrable, therefore to formylate the β-hydroxyketone at a temperature range of about 0 to 50° C. and preferably about 10 to 30° C.

The basic catalyst for the formylation reaction is usually a metal alkoxide, although other basic materials, such as sodium metal and the like can be used.

The order of addition of components has been found to have an effect on the yields of the formylation reaction. Low yields, probably due to the polycondensation of the ketone, were obtained when the ketone and formate ester were added together to the catalyst. Increased yields were obtained by the formation of catalyst-ester complex, from the formate ester and base, prior to the addition of the ketone to the reaction mixture.

Reverse addition of the base-ester complex to a ketone solution has also been successfully used, even at temperatures of about 30 to 50° C. which would normally lead to polycondensation of the ketone.

The reaction medium can be any organic solvent which does not enter into a reaction wtih any component or product. Ethers, hydrocarbons and aromatic hydrocarbons have been used successfully, with diethyl ether and benzene being the preferred solvents.

Alcohols, within specific limitations, may also be used as a solvent. There is a possibility of alcohol addition to the ethylenic linkage of the alkenones under the condition of the formylation reaction. This possibility decreases as the alcohol chain length increases. In addition, the alcohol solvent can interchange with the ester or metal alkoxides releasing a lower alcohol to the system which adds to the ethylene linkage. When alcohol is used as the solvent, it is preferable to use the same alkyl moiety in both the ester and alkoxide to avoid these side reactions. The side reactions are not critical when the β-hydroxyalkanone is used as the starting compound and therefore alcohol can readily be used as the solvent.

The reaction of ketone with formate ester probably involves the addition of the α-methyl group to the carboxyl carbon of the ester with a subsequent elimination of the alcohol moiety of the formate, forming a 1,3-diketone which in the basic medium exists mainly as the enolate. Although other carboxylic esters react in the same manner, only the formate ester gives the desired hydroxy derivative. The alcohol moiety which has a maximum of eight carbon atoms of the formate ester is not important and includes, among others, methyl, ethyl, propyl and butyl. n-Butyl formate is the preferred ester in the formylation reaction with alkenones and methyl formate in the reaction with β-hydroxyketones.

1-hydroxyalka-1,4-diene-3-one which is formed in the reaction is present as its most stable form, the sodium enolate form, while in the basic medium. Acidification gives the free hydroxy compound which is unstable and difficult to isolate. As a consequence, the synthesis is continued without isolation of the intermediate or the intermedaite is isolated as the metal salt. The salt of 1-hydroxyhexa-1,4-diene-3-one has been isolated and characterized by infra-red spectra.

Treatment of the sodium enolate salt of 1-hydroxyalka-1,4-diene-3-one with an acylating agent in an inert solvent yields 1-acyloxyalka-1,4-diene-3-one. Aromatic and aliphatic acid chloride and anhydrides and chloroformates have been used in this reaction with high yields. When aromatic acid chlorides, such as benzoyl chloride, or chloroformates are used as the acylating agent the reaction can be run in an aqueous medium. The use of an inert medium such as ethers, hydrocarbons, aromatic hydrocarbons and the like, is necessary due to the activity of many acid chlorides and anhydrides with reactive solvents.

The reaction is not normally dependent upon temperature, high yields being obtained at about room temperature. After the acylation has taken place, the reaction mixture can be heated to ensure completion of reaction.

Examples of acylating agents which can be used in this process include acetyl chloride, acetic anhydride, acetyl bromide, propionyl chloride, propionic anhydride, mixed anhydrides, such as acetic propionic anhydrides, benzoyl chloride and chloroformates, such as ethyl and methyl chloroformates.

1-acyloxyalka-1,4-diene-3-one can be considered to be either a vinyloge of an acid anhydride or as a β-ketovinyl ester and as such undergoes reactions typical for these compounds.

Reaction of 1-acyloxyalka-1,4-diene with less than equal molar quantity of a primary alcohol in the presence of an acid, yields 1-alkoxyalka-1,4-diene-3-one which can be reacted further with the same or a different alcohol, also in the presence of an acid, to yield a compound having the following formula:

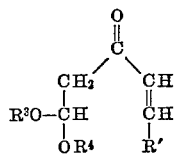

in which R' is an alkyl group having a maximum of 4 carbon atoms and $R^3$ and $R^4$ are alkyl groups having a maximum of 8 carbon atoms. The groups $R^3$ and $R^4$ can be the same or different.

If the acyloxy derivative is reacted with more than equal molar quantity of an alcohol, in the presence of an acid the reaction will proceed to the 1,1-dialkoxy derivative and the intermediate 1-alkoxy derivative is not obtained.

Reaction of the acyloxy derivative with alcohol was monitored by infra-red spectroscopy. Acyloxyalka-1,4-diene-3-one has a strong, very specific absorption band at 1786 cm.$^{-1}$, which is for the unsaturated ester linkage. As the group is replaced by an alkoxy group, this band decreases in intensity and finally disappears at completion of the reaction.

The alcohols used in this reaction are primary alcohols having a maximum of 8 carbon atoms. Since the reaction is run in the presence of an acid, secondary reactions may occur with secondary and tertiary alcohols, such as dehydration of the secondary alcohols, and carbonium ion formation of tertiary alcohols which interfere with the main reaction.

Examples of primary alcohols which can be used in this reaction include methanol, ethanol, propanol, butanol, and 2-methyl butanol.

Acid catalysts for this reaction can be inorganic such as mineral acids which includes hydrochloric acid and sulfuric acid, or organic acids such as p-toluene-sulfonic acid. The preferred catalyst is p-toluenesulfonic acid.

Following the formation of the dialkoxy derivative, the reaction mixture can be neutralized and the 1,1-dialkoxyalk-4-ene-3-one isolated or the mixture is made basic and the ethylene linkage epoxidated without a prior isolation of the dialkoxy derivative.

Epoxidation of the 1,1-dialkoxyalk-4-ene-3-one, which may or may not have been previously isolated, occurs at alkaline pH which is usually in the range of about 8 to 9. Reaction rates at a pH of about 7 to 8 are usually slow, and at pH above about 9.5 side reactions occur which lower the yield of epoxy compound.

The solvent for use in this reaction is preferably a poor nucleophile, i.e. a reagent which does not readily seek an electron deficient nucleus, thus preventing a base catalyzed addition to the activated double bond. It is preferred that the solvent be miscible with water since aqueous hydrogen peroxide is the preferred epoxidation agent and that its boiling point be such that permits easy separation of solvent from the product. When other than hydrogen peroxide is used as epoxidation agent, the solvent need not be water-miscible. Examples of solvent systems which can be used include methanol, isopropanol, isopropanol-water, water, benzene and the like.

Cumene hydroperoxide and t-butyl hydroperoxide have been used as epoxidation agents in addition to hydrogen peroxide.

Reaction temperature during epoxidation is maintained below about 80° C. and preferably below about 50° C.

Acid hydrolysis of 1,1-dialkoxy-4,5-epoxy-alkane-3-one yields either 2-alkyl-3-hydroxy-6-alkoxy-tetrahydro-4-pyrone (VI) or 2-alkyl-3-hydroxy-2,3-dihydro-4-pyrone (VIa) dependent upon the reaction temperature and conditions.

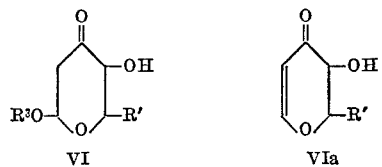

VI    VIa

Acid catalysts for this hydrolysis can be inorganic, such as mineral acids which includes hydrochloric and sulfuric acids, or organic such as p-toluenesulfonic acid. Hydrochloric acid in an aqueous medium is the preferred system.

Reaction temperature varies from about 25 to 100° C., with the rate of hydrolysis increasing as the temperatures increases. At the higher temperatures the alcohol is prevented from being distilled off in order to obtain compound VI. It is preferred to run this reaction at about 40 to 60° C. which is below the boiling point and azeotropic temperatures of most alcohol-water systems, with which we are concerned and still permits the reaction to proceed at a practical rate.

Isolation of either compound VI or VIa is from an essentially neutral solution because of the reactivity of the molecules to either acid or base catalysis.

The conversion of compounds VI to 4-pyrones can take one of three routes:

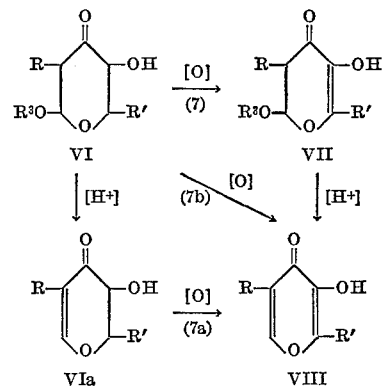

VIa    VIII

Isolation of the intermediate compounds is not necessary nor is it necessary to isolate the starting compounds VI or VIa from the hydrolysis-cyclization reaction.

In following step (7), 2-alkyl-3-hydroxy-6-alkoxy-tetrahydro-4-pyrones VI is oxidized in a basic medium in the presence of platinum or palladium to form 2-alkyl-3-hydroxy-6-alkoxy-5,6-dihydro-4-pyrones VII which on acid hydrolysis and removal of the alcohol, as formed, yields 2-alkyl-3-hydroxy-4-pyrones VIII. The oxidation reaction following this step is normally run in an aqueous medium at a pH of about 7.5 to 11, with a pH of about 8 to 10 being preferred, at a temperature below about 50° C. Oxygen is the active oxidative agent and is introduced into the reaction as a mixture with other gases, such as in air. The reaction with air-platinum is a selective reaction for axial hydroxy groups, oxidizing the hydroxy group to the 3,4-dione which enolizes to the α-hydroxyketone VII.

Following oxidation, the reaction mixture is filtered to remove the catalyst and compound VII isolated, or the reaction mixture is acidified and heated, distilling off the alcohol formed during the hydrolysis. The product 2-alkyl-3-hydroxy-4-pyrone VIII is then isolated by standard procedures.

Step (7a) involves removal of the alkoxy group in the 6-position forming a double bond in the 5,6-position. As described previously herein compound VIa can be formed directly from 1,1-dialkoxy-4,5-epoxy alkane-3-one V without going through the intermediate VI.

Oxidation of compound VIa in a basic medium in the presence of a platinum catalyst, utilizing an oxygen atmosphere, such as air, yields 2-alkyl-3-hydroxy-4-pyrone VIII. Reaction temperatures are generally maintained at about 50° C. although higher temperatures can be used. For the oxidation of the 2,3-dihydro-4-pyrones in base, the pH of at least 9 is maintained.

Formation of 2-alkyl-3-hydroxy-4-pyrone VIII directly from the tetrahydro-4-pyrone VI (step 7b) usually requires higher reaction temperatures. This reaction is also run in a basic aqueous medium but at temperatures between about 50 and 100° C. Catalysis is generally not required if the medium is basic at pH of at least 9.

In the above oxidation reactions, oxygen or an oxygen containing gas is introduced to the system at a rate which maintains the desired reaction temperatures and which is mechanically feasible for the equipment being used. For temperatures 50° C. or below, cooling may be necessary to regulate the temperature while still maintaining a practical gas flow rate and above 50° C., heating may be required.

Other oxidizing agents, such as chromium trioxide-pyridine complex, bismuth triacetate and chromium trioxide, can be used in place of the oxygen containing gases. In these cases the chemical oxidizing agent is added in small increments, either as a solid or in solution, to the reaction mixture. The temperature is preferably maintained below about 50° C. and preferably below 20° C. when chromium trioxide is the oxidizing agent.

Although aqueous basic reaction mediums are normally employed in the oxidation of the tetrahydro-4-pyrones and the 2,3-dihydro-4-pyrones to maltol and maltol derivatives, other non-aqueous mediums, such as potassium t-butylate in t-butanol can also be used as an oxidative medium.

The final oxidation product in each case is 2-alkyl-3-hydroxy-4-pyrone which is isolated and purified.

A specific embodiment of the above generalized process is to react either 4-hydroxypentane-2-one or pent-3-ene-2-one with a formate ester in a basic medium at a temperature below 50° C. to form 2-hydroxy hexa-1,4-diene-3-one (II, R is H; R′ is CH$_3$). The reaction of this intermediate with an acylating agent, such as acetyl chloride, yield the ester 1-acetoxyhexa-1,4-diene-3-one (III, R is H; R′ and R$^2$ are CH$_3$), which is then converted to 1,1-dimethoxyhex-4-ene-3-one (IVb, R is H; R′ and R$^3$ are CH$_3$) by methanol, in an acidic medium. Epoxidation of the remaining ethylene linkage occurs in an aqueous basic solution of hydrogen peroxide, and results in the formation of the epoxide 1,1-dimethoxy-4,5-epoxyhexane-3-one (V, R is H; R′ and R$^3$ are CH$_3$). Acid hyddrolysis, in water, opens the epoxide ring and cyclizes the compound to 2-methyl-3-hydroxy-6 - methoxytetrahydro - 4 - pyrone (VI, R is H; R′ and R$^3$ are CH$_3$). Air oxidation in a basic medium, in the presence of a platinum or palladium medium yields 2-methyl-3-hydroxy-6-methoxy-5,6-dihydro-4-pyrone (VII, R is H; R′ and R$^3$ are CH$_3$), which on acid hydrolysis at elevated temperatures, distilling off the alcohol as it forms, yields maltol, 2-methyl-3-hydroxy-4-pyrone (VIII, R is H; R′ is CH$_3$).

The following examples are illustrative only of the invention:

EXAMPLE 1

Preparation of the starting compound, alk-3-ene-2-one, is according to conventional methods for crossed condensation reactions. The following preparation of 3-pentene-2-one is an illustration of this reaction.

About 3520 ml. acetaldehyde was added over a 15 minute period to a mixture of 9000 ml. of acetone, 2760 ml. of water and 247 ml. of 0.2 N sodium hydroxide. The temperature of the reaction mixture was maintained at 50–55° C. throughout the acetaldehyde addition. Additional 0.2 N sodium hydroxide was added during the addition of acetaldehyde to maintain a pH of 8.0 and 9.0 To maintain the desired basicity, an additional 150 to 240 ml. of 0.2 N sodium hydroxide was required. Upon completion of the acetaldehyde addition, the temperature was maintained at 50 to 55° C. for an additional hour after which the reaction mixture was neutralized with 8 to 12 g. oxalic acid. Excess acetone was removed by distillation from the reaction mixture until a pot temperature of 95 to 105° C. was obtained. The residue was cooled and 170 ml. of 50% aqueous sulfuric acid added. Distillation was resumed and the ketone-water azeotrope collected until a pot temperature of 145° C. was obtained. The aqueous layer was extracted with three 1000 ml. portions of benzene and the benzene combined with the organic phase. Fractionation of the organic phase, after removal of the benzene, yielded a 3-pentene-2-one product, 67% based on acetaldehyde, which had a 90% minimum purity. Further purification yields 3-pentene-2-one B.P. 120–122° C.

EXAMPLE 2

Preparation of β-hydroxyketones is through a crossed aldol condensation as illustrated by the following preparation of 4-pentanol-2-one:

About 132 g. acetaldehyde was added with stirring over a 3 hour period to a mixture of 880 ml. of acetone and 12 ml. of a 3 N methanolic potassium hydroxide solution maintained at 10° C. Additional methanolic potassium hydroxide was added during the course of the reaction to maintain a pH of 8.0 to 9.0. After completion of addition, the reaction mixture was stirred an additional 30 minutes and then neutralized with 3 N methanolic oxalic acid. Solids which precipitated from the solution were removed by filtration and the filtrate distilled to remove the methanol and excess acetone. Distillation was continued until a pot temperature of 110° C. was reached. The residue was then fractionally distilled under reduced pressure to yield a product B.P. 72–105° C./25–35 mm. which was a mixture of 4-pentanol-2-one and diacetonealcohol. Further purification yields 4-pentanol-2-one, B.P. 62–64° C./12 mm.

EXAMPLE 3

The 4-pentanol-2-one prepared in accordance with Example 2 can be used as the starting compound in the synthesis of maltol or it can be dehydrated to 3-pentene-2-one as follows:

About 543.8 g. ketoalcohol mixture, obtained in Example 2, was added dropwise to 0.5 g. concentrated sulfuric acid and the product flash distilled. The volume of ketoalcohol in the distillation flask was maintained at 50 ml. throughout the course of the distillation. Benzene (100 ml.) was added to the distillate and the water layer which separated removed. The water layer was saturated with sodium sulfate and extracted with 30 ml. benzene which was combined with the organic phase. Azeotropic distillation removed the last traces of water and benzene. Fractionally distillation of the residue yielded a product containing 86% 3-pentene-2-one which was further purified to give 3-pentene-2-one B.P. 120–122° C.

EXAMPLE 4

Formylation of 3-pentene-2-one occurs as follows:

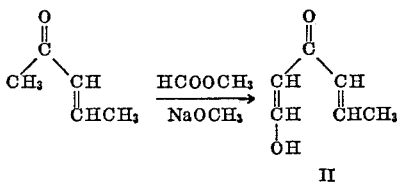

To a slurry of 16.2 g. (0.3 mole) of sodium methoxide in 100 ml. of dry benzene was added with stirring 36.0 g. (0.6 mole) of methyl formate. A thick gel of the ester-methoxide complex formed, which was chilled to −10° C. Pent-3-ene-2-one (25.8 g., 0.3 mole) was added to the gel with vigorous stirring at a rate which maintained the temperature at −10° C. or below. The ester complex slowly dissolved turning the reaction mixture yellow. A final light tan solution was obtained upon completion of addition. The solution was stirred for an additional hour at −10° C., one hour at 0° C. and then gradually warmed to room temperature. Concentration of the mixture under reduced pressure yielded the sodium enolate salt of 1-hydroxyhexa-1,4-diene-3-one (II). Characterization of this compound was by infra-red spectra, having absorption bands at 12.94 and 13.09μ.

EXAMPLE 5

The procedure of Example 4 was substantially repeated using n-butyl formate in place of methyl formate to give the sodium enolate salt of 1-hydroxyhexa-1,4-diene-3-one.

EXAMPLE 6

The general procedure of Example 4 was repeated using diethyl ether as solvent in place of dry benzene in the preparation of 1-hydroxyhexa-1,4-diene-3-one (II).

EXAMPLE 7

Formylation of 4-pentanol-2-one proceeds as follows:

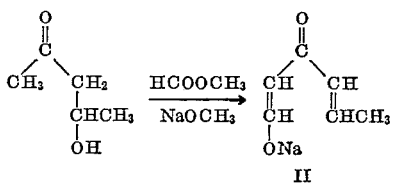

To a solution of 32.4 g. (0.6 mole) of sodium methoxide in 150 ml. of dry methanol was added 36.0 g. (0.6 mole) of methyl formate. Pentane-4-ol-2-one (30.6 g., 0.3 mole) was added dropwise with stirring and cooling. The temperature during the addition was maintained below 30° C. Upon completion of addition the reaction mixture was stirred overnight at room temperature. Concentration of the mixture under reduced pressure yielded the sodium enolate salt of 1-hydroxyhexa-1,4-diene-3-one (II) which was characterized by infra-red spectra, having absorption bands at 12.94μ (773 cm.$^{-1}$) and 13.09μ (764 cm.$^{-1}$).

EXAMPLE 8

Acetylation of the enolate salt of 1-hydroxyhexa-1,4-diene-3-one is according to the following procedure:

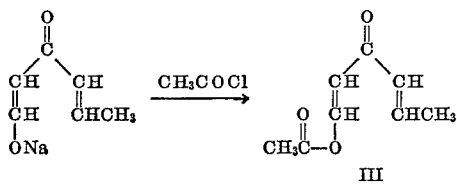

To a solution of 40.2 g. (0.3 mole) of the sodium salt of 1-hydroxyhexa-1,4-diene-3-one in 100 ml. dry benzene was added, with stirring and cooling, 23.6 g. (0.3 mole) of acetyl chloride maintaining the temperature at about 30° C. throughout the addition. The solution turned a dark red during the addition. The mixture was refluxed for 30 minutes, cooled, the sodium chloride filtered off and the filtrate concentrated under reduced pressure. Fractional distillation of the residue yielded a fraction boiling at 71–75° C./3 mm. which was identified by infra-red spectra as 1-acetoxyhexa-1,4-diene-3-one, showing the very strong enol ester band at 1786 cm.$^{-1}$. This spectra was similar to previously identified 4-acetoxy-but-3-ene-2-one.

EXAMPLE 9

1-acetoxyhexa-1,4-diene-3-one can be prepared according to the following procedure without isolation of the intermediate enolate salt (II):

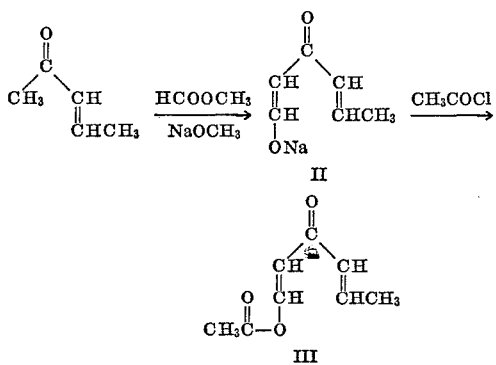

To a stirred slurry of 16.2 g. of sodium methoxide in 260 ml. of dry benzene was added dropwise a mixture of 25.2 g. (0.3 mole) pent-3-ene-2-one and 18.0 g. (0.3 mole) of methyl formate at such a rate that the temperature remained at about 0° C. Stirring was continued, after the addition, for another 30 minutes at 0° C. and then 1 hour at room temperature. The methanol which formed during the reaction, was removed by azeotropic distillation with benzene. Throughout the distillation, additional benzene had to be added to keep the slurry stirrable. After removal of the methanol, the mixture was cooled to 30° C. and 23.6 g. (0.3 mole) of acetyl chloride was added at a rate that maintained the temperatures at 30° C. Upon completion of addition, the mixture was refluxed for 1 hour, cooled to 30° C. and filtered to remove the sodium chloride formed in the reaction. The filtrate was concentrated and the residue fractionally distilled yielding a fraction boiling at 71–75° C./3 mm. which was identified by infrared spectra as 1-acetoxyhexa-1,4-diene-3-one.

EXAMPLE 10

The conversion of 1-acetoxyhexa-1,4-diene-3-one to 1,1-dimethoxyhexa-1,4-diene-3-one proceeds as follows:

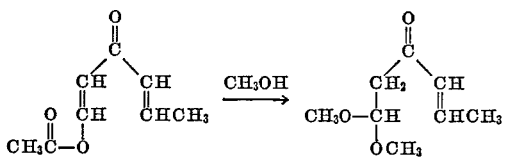

1-acetoxyhexa-1,4-diene-3-one (23.1 g., 0.15 mole) was dissolved in 26.2 ml. (0.6 mole) dry methanol and to the resultant solution was added 0.3 ml. of a 10% methanolic solution of p-toluenesulfonic acid. A strong exothermic reaction took place raising the temperature to 50° C. The reaction was stirred at room temperature for 60 hours after which the solution was neutralized with sodium dicarbonate, diluted with water and the aqueous solution extracted with benzene. The benzene extract was washed with water, dried and concentrated. Distillation of the residue gave 1,1-dimethoxy-hex-4-ene-3-one, B.P. 70–85° C./4 mm. Infra-red spectra showed disappearance of the strong enol ether absorption band and formation of second band in ketone region due to the acetal formation.

EXAMPLE 11

The formation of 1-methoxyhexa-1,4-diene-3-one from the acetoxy derivative formed in Examples 8 or 9 is as follows:

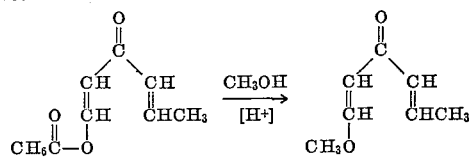

To 5.4 g. (0.04 mole) 1-acettoxyhexa-1,4-diene-3-one in 1 ml. anhydrous methanol was added 0.1 ml. of a 10% methanolic solution of p-toluenesulfonic acid. The temperature of the mixture rose to 35° C. This mixture was stirred at room temperature overnight and then neutralized, benzene added and the mixture filtered. The benzene was washed with water, dried and concentrated. Distillation of the residue gave 1-methoxyhexa-1,4-diene-3-one, boiling point 83–84° C./2.5 mm. The compound was characterized by infra-red spectra having absorption bands at 1658, 1634 and 1585 cm.$^{-1}$. Dissolving the product in methanol and adding p-toluenesulfonic acid yielded 1,1-dimethoxy-hex-4-ene-3-one.

EXAMPLE 12

Alkaline epoxidation of 1,1-dimethoxyhex-4-ene-3-one proceeds as follows:

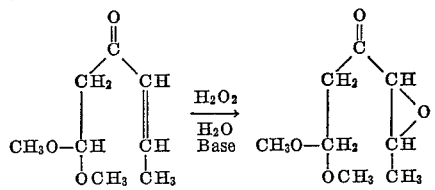

To a mixture of 15.8 g. (0.1 mole) 1,1-dimethoxyhex-4-ene-3-one in 75 ml. distilled water was added 4 N sodium hydroxide until a pH of about 8.0 to 8.5 was obtained. To this mixture was added with stirring over a 30 minute period 7.8 ml. of a 30% hydrogen peroxide solution. The reaction temperature was maintained at about 30° C. throughout the addition. Stirring was continued for 30 minutes, upon completion of addition, followed by neutralization of the mixture. The mixture was extracted with chloroform and the chloroform fraction was washed with water, dried and concentrated.

EXAMPLE 13

Cyclization of 1,1-dimethoxy-4,5-epoxyhexan-3-one is as follows:

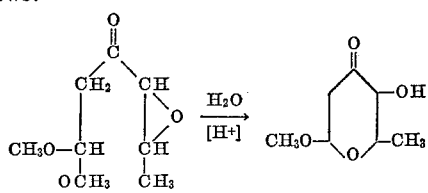

The concentrate from Example 12 was slurried in dilute aqueous hydrochloric acid at 40° C. for a period of 45 minutes. The reaction mixture was neutralized with sodium bicarbonate and extracted with chloroform. The chloroform fraction was washed with water, dried and concentrated to a brown red oil.

EXAMPLE 14

Formation of 2-methyl-3-hydroxy-6-methoxy-5,6-dihydro-4-pyrone is according to the following procedure:

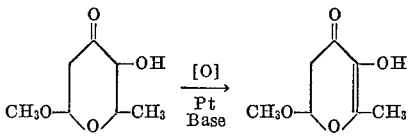

The product obtained in Example 13 was mixed with aqueous sodium hydroxide, to a pH of about 8.5, and the mixture heated to about 45° C. Air was passed through this system for a period of 3 hours at a rate which maintained the temperature at about 45° C. Occasional heating was required to aid in maintaining this temperature. The mixture was then cooled and extracted with benzene. Benzene fraction was washed, dried and concentrated.

EXAMPLE 15

Formation of maltol from 2-methyl-3-hydroxy-5,6-dihydro-4-pyrone is as follows:

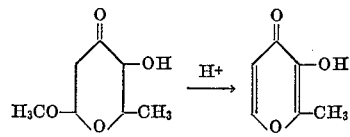

The concentrate obtained in Example 14 was dissolved in dimethylphthalate and a catalytic amount of p-toluenesulfonic acid was added to the resultant solution. The solution was heated and the methanol, which was evolved during the heating, was distilled off. Distillation of the residue under reduced pressure gave a colorless distillate which on cooling deposited maltol. The maltol was collected by filtration washed with ether and dried—M.P. 161–162° C.

EXAMPLE 16

Cyclization of 1,1-dimethoxy-4,5-epoxyhexan-3-one to 2 - methyl - 3 - hydroxy - 2,3 - dihydro - 4 - pyrone is as follows:

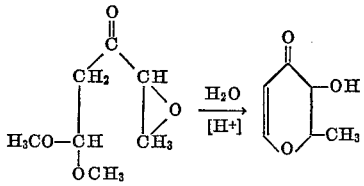

The concentrate from Example 12 was refluxed with dilute sulfuric acid for a period of 30 minutes. The apparatus was then adapted for distillation and the alcohol formed in the reaction and part of the water removed by distillation. The residue was cooled, saturated with salt and extracted with benzene. The benzene fraction was washed with water, sodium bicarbonate solution, water and then dried and concentrated.

EXAMPLE 17

Formation of maltol by oxidation of 2-methyl-3-hydroxy-2,3-dihydro-4-pyrone is according to the following procedure:

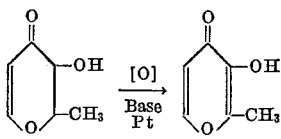

The concentrate from Example 16 was mixed with aqueous sodium hydroxide, at a pH of at least 9.0, and a platinum catalyst and aerated at about 50° C. for a period of 3 hours. The mixture was cooled, acidified with dilute hydrochloric acid and extracted with chloroform, which was dried, treated with charcoal, concentrated and the residue distilled. Fraction boiling at 130–150° C./1 mm.

13

(bath temperature) was collected, which on cooling yielded a white solid and an oil. The oil was removed by washing with a little cold diethyl ether. Recrystallization of the solid gave maltol, M.P. 161–162° C.

EXAMPLE 18

Formation of maltol by oxidation of 2-methyl-3-hydroxy-6-methoxy-tetrahydro-4-pyrone is as follows:

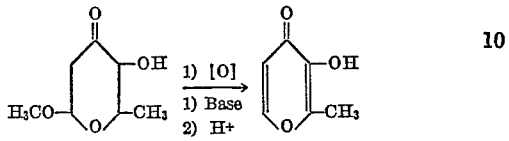

The concentrate from Example 13 was refluxed and aerated in aqueous sodium hydroxide at a pH of at least 9 for a period of 3 hours. The mixture was cooled, acidified with dilute hydrochloric acid and extracted with chloroform, which was dried, treated with charcoal, concentrated and the residue distilled. Fraction boiling at 135–150° C./1 mm. (bath temperature) was collected, which on cooling yielded a white solid and an oil. The oil was removed by washing with a little cold diethyl ether. Recrystallization of the solid gave maltol, M.P. 161–162° C.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A process for preparing 2-alkyl-3-hydroxy-4-pyrones which comprises.

(a) reacting a compound having the formula:

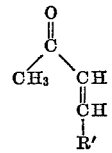

wherein A is selected from the group consisting of CH=CHR' and CH$_2$CH(OH)R' in which R' is an alkyl group having a maximum of 4 carbon atoms, with an alkyl formate said alkyl having a maximum of 8 carbon atoms in a basic medium at a temperature below about 50° C. to form an intermediate having the following formula:

wherein R' is as identified above, (b) reacting said intermediate in an inert solvent with an acylating agent to form 1-acyloxyalka-1,4-diene-3-one,
(c) reacting said 1-acyloxyalka-1,4-diene-3-one with a primary alcohol, having a maximum of 8 carbon atoms, in the presence of an acid to yield 1,1-dialkoxyalk-4-ene-3-one,
(d) treating 1,1-dialkoxyalk-4-ene-3-one with an epoxidation agent in a basic medium to yield 1,1-dialkoxy-4,5-epoxyalkan-3-one,
(e) heating the 1,1-dialkoxy-4,5-epoxyalkan-3-one, in an acidic medium in an approximate temperature range of 25 to 100° C. to form 2-alkyl-3-hydroxy-6-alkoxytetrahydro-4-pyrone,
(f) oxidizing said tetrahydropyrone with an oxidizing agent in a basic medium in the presence of a catalyst,

14 at a temperature in the approximate range of 25 to 100° C. to form 2-alkyl-3-hydroxy-6-alkoxy-2,3-dihydro-4-pyrone, and
(g) distilling said 2-alkyl-3 - hydroxy-6-alkoxy-2,3-dihydro-4-pyrone in the presence of an acid catalyst to yield 2-alkyl-3-hydroxy-4-pyrone.

2. A process in accordance with claim 1, wherein:

(a) said compound has the formula:

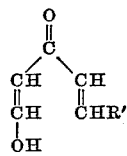

wherein R' is an alkyl group having a maximum of 4 carbon atoms and said alkyl formate having an alkyl group having a maximum of 8 carbons, (b) said acylating group being selected from the group consisting of alkyl acid chlorides, aromatic acid chlorides, alkyl acid anhydrides, aromatic acid anhydrides and chloroformates,
(c) said primary alcohol being an aliphatic alcohol having a maximum of 8 carbon atoms and said acid being selected from the group consisting of aliphatic carboxylic acids, aromatic carboxylic acids, aromatic sulfonic acids, and mineral acids,
(d) said epoxidation agent being selected from the group consisting of cumene hydroperoxide, t-butyl hydroperoxide and hydrogen peroxide, and
(f) said basic medium comprises a base and a water solvent and said catalyst is a platinum catalyst.

3. A process in accordance with claim 2, wherein:

(a) said alkyl formate being selected from the group consisting of methyl formate, ethyl formate, propyl formate and butyl formate, said basic medium comprises a methyl alkoxide selected from the group consisting of sodium methoxide, sodium ethoxide and sodium propoxide, and a solvent selected from the group consisting of alcohols, aliphatic ethers, aliphatic hydrocarbons, and aromatic hydrocarbons.
(b) said acylating agent is acetyl chloride,
(c) said primary alcohol is methanol and said acid is p-toluene sulfonic acid,
(d) said epoxidation agent is hydrogen peroxide,
(e) said acidic medium comprises an acid selected from the group consisting of organic acids and mineral acids and a water solvent, and
(f) said oxidizing agent is selected from the group consisting of an oxygen containing gas, chromium trioxidepyridine complex, bismuth triacetate and chromium trioxide.

4. A process in accordance with claim 3, wherein:

(a) said alkyl formate is methyl formate, said metal alkoxide is sodium methoxide and said solvent is benzene, and said temperature is below about 50° C.,
(b) said inert solvent is diethyl ether,
(c) said acid is hydrochloric acid and said temperature is about 40 to 60° C., and
(f) said oxygen containing gas is air and said temperature is about 25 to 50° C.

5. A process in accordance with claim 1 wherein:

(a) said compound has the following formula:

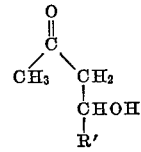

in which R' is an alkyl group having a maximum of 4 carbon atoms.

6. A process in accordance with claim 5 wherein:
(a) said compound has the following formula:
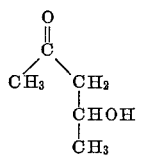
and said temperature is below 30° C.
References Cited
UNITED STATES PATENTS
3,159,652  12/1964  Tate et al. _____ 260—345.9
3,130,204   4/1964  Tate et al. _____ 260—345.9
3,171,842   3/1965  Tate _____ 260—345.9
NORMA S. MILESTONE, Primary Examiner
U.S. Cl. X.R.
260—469, 483, 594